A. EWING.
LIQUID FUEL BURNER.
APPLICATION FILED OCT. 7, 1912.
1,108,728. Patented Aug. 25, 1914.
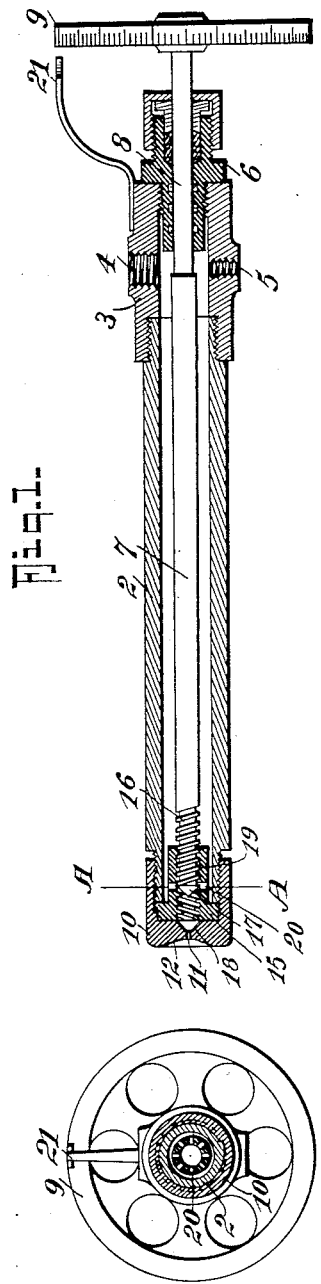
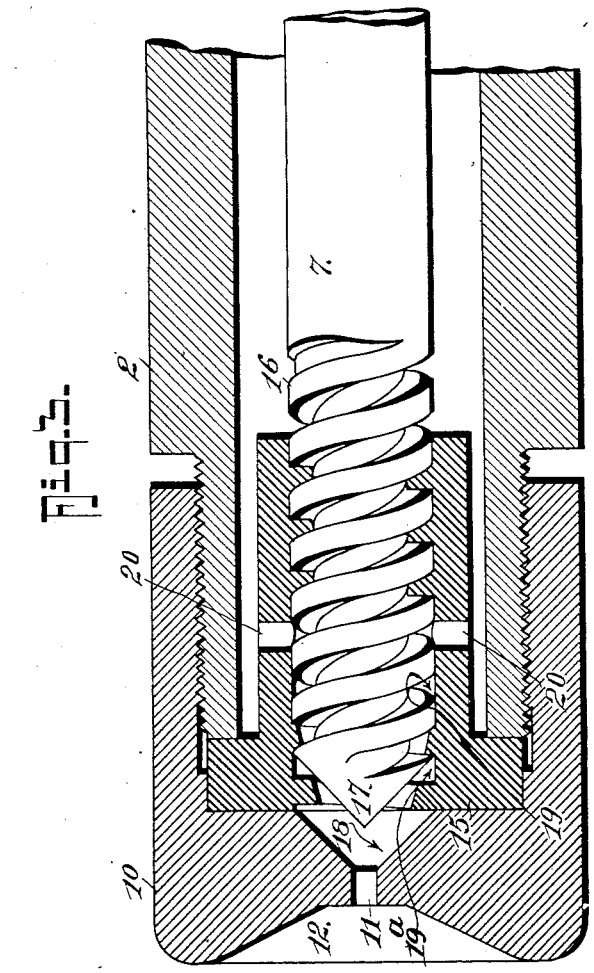
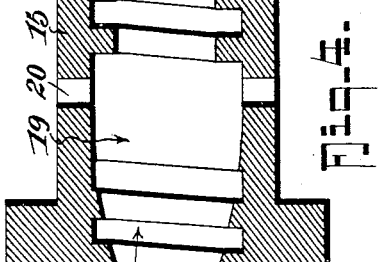
WITNESSES:
John T. Schrott
Robert M. Grunwell
INVENTOR
Alexander Ewing
BY
Fred G. Dieterich
ATTORNEYS.

UNITED STATES PATENT OFFICE.

ALEXANDER EWING, OF VICTORIA, BRITISH COLUMBIA, CANADA.

LIQUID-FUEL BURNER.

1,108,728. Specification of Letters Patent. Patented Aug. 25, 1914.

Application filed October 7, 1912. Serial No. 724,382.

*To all whom it may concern:*

Be it known that I, ALEXANDER EWING, citizen of the Dominion of Canada, residing at Victoria, in the Province of British Columbia, Canada, have invented a new and useful Liquid-Fuel Burner, of which the following is a specification.

This invention relates to a liquid fuel burner of that class wherein the oil is delivered to the burner under pressure and is, by its escape through a restricted outlet, broken up into a finely divided spray.

My object has been to provide an effective burner having a means within itself for varying the amount of oil used without requiring to change the pressure of the oil service or the burner parts.

There are other incidental features of improvement to which attention is called in the following specification which fully describes the invention, reference being made to the drawings by which it is accompanied, in which:

Figure 1 is a longitudinal section through the burner. Fig. 2, a cross section on the line A, and Fig. 3, an enlarged detail of the burner end. Fig. 4 is a detail sectional view of a portion of the nut showing where the thread is mutilated to form the chamber into which the fluid passes.

The burner comprises an elongated tubular body 2 to one end of which is secured a head portion 3 having an oil service connection at 4 and opposite to it a steam pipe connection at 5. The steam is intended only to clear the burner in the event of it becoming choked. In the end of the head 3 is secured a packed gland 6 through which passes a stem 7 which is reduced, as at 8, where it passes through the gland, and at the outer end has a hand wheel 9 secured on it. On the other end of the tubular body 2 a cap 10 is screwed, securing against the end of the tube a nut member 15 to be described later. The cap 10 has a small axial aperture 11 which, on its inner side, is conically enlarged to its seat on the interposed nut 15, and on the outer side has a shallow depression 12. The nut member 15 is threaded to receive the screw threaded end 16 of the stem 7, the extreme end of which stem is coned, as at 17. The nut 15 is chambered, as at 19, to the bottom of the thread and radial apertures 20 deliver from the outside of the nut to the chambered recess, the end of which recess, toward the delivery, is tapered to the inner diameter of the thread in the nut. It will be noted that the chambering of this nut does not exceed the depth of the thread, so that when the screwed end 16 of the stem 7 is in the nut the oil must follow the threads of the screw to reach the outlet.

The amount of oil which passes along the thread of the screw is subject to variation by moving the screwed end 16 of the stem into, or withdrawing it from the tapered end of the bore 19ᵃ of the nut. In such movement the conical end 17 on the stem penetrates the corresponding conical enlargement 18 of the inner side of the cap 10, limiting the space there as the delivery into that space is restricted. Thus in use, the oil delivered at 4 passes through the radial apertures 20 and follows the threads of the screw in the nut and delivers into the conical enlargement of the cap, with a swirling movement, which movement is retained as it is delivered through the aperture 11 and aids diffusion of the oil spray as it leaves the aperture. The amount of oil passing through each burner may thus be readily varied to its special requirements without the necessity of altering the pressure of the oil service, which alteration might not be satisfactory to other burners in the system, and this variation is effected without otherwise altering the efficiency of the burner.

The rim of the hand wheel 9 may be graduated and a fixed pointer 21 may be secured to the burner head 3 so that the position of the end of the stem in the nut may be indicated.

Having now particularly described my invention, I hereby declare that what I claim as new and desire to be protected in by Letters Patent, is:

A liquid fuel burner, comprising in combination a tubular body having an oil receiving opening, a cap threaded to said body at one end, a nut secured between said cap and the end of said body and projecting into said body and spaced from the walls thereof, said nut having a threaded bore one portion of which is mutilated to form a chamber intermediate the ends of the nut, said nut having radial apertures for affording communication between said chamber and the interior of said body, and a valve rod threaded into said nut and having a valve end, said cap having a valve seat to coöperate with said valve end, and having an aperture to permit passage of the fluid the threads in the bore of the said nut between the mutilated chamber and the inner end of the nut being designed to closely fit the threads of said valve rod, whereby to effect a substantial closure of the inner end of said nut to cause the oil to pass through the space between said nut and the walls of said body and flow through said radial apertures into said bore.

In testimony whereof I have signed my name to this specification in the presence of two subscribing witnesses.

ALEXANDER EWING.

Witnesses:
JOHN D. WATERHOUSE,
C. J. SAVAGE.